(12) United States Patent
Casey et al.

(10) Patent No.: US 6,209,031 B1
(45) Date of Patent: *Mar. 27, 2001

(54) CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS

(75) Inventors: Walter William Casey; Jeffrey Randell Dean; Jeffrey Langdon Howard; Ingrid Milagros Rodriguez, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/118,210

(22) Filed: Jul. 17, 1998

(51) Int. Cl.$^7$ .................................................. G06F 13/00

(52) U.S. Cl. ............................................. 709/222; 717/11

(58) Field of Search .................................... 709/222, 221, 709/220; 395/712; 717/11

(56) References Cited

U.S. PATENT DOCUMENTS 5,684,952 * 11/1997 Stein ..................................... 709/221
5,742,829 * 4/1998 Davis et al. .......................... 717/11

(List continued on next page.)

FOREIGN PATENT DOCUMENTS

| 0 241 678 A2 | 10/1987 | (EP) . |
| WO 98/47057 A2 | 10/1998 | (EP) . |
| 2311 388 | 9/1997 | (GB) . |

OTHER PUBLICATIONS

Dialog record 01825764 & PC Week, v12, n33, pS18(2), Aug. 21, 1995, "Promise LANd (network utilities in Microsoft Windows 95)", M. Surkan.

Dialog record 01760676 & Newsbytes, pNEW03170001, Mar. 17, 1995, "Microsoft Licenses key Windows 95 System Mgt. Technology".

"Guide to MS Windows NT 4.0 profiles and policies", Jul. 7, 1998, pp. 1–8, at www.segurancant.com/prof.html.

Novell Research, Nov. 1996, "Using the Novell Application Launcher (NAL) Utility with Client 32 for Windows 95," by Anderson et al., http://developer.novell.com/research/appnotes/1996.november/06/index.htm.

(List continued on next page.)

*Primary Examiner*—Kenneth R. Coulter
(74) *Attorney, Agent, or Firm*—J. B. Kraft; Richard A. Henkler; Leslie A. VanLeeuwen

(57) ABSTRACT

A network of a server and a plurality of client computers for small businesses which is easy to install, configure and operate and still provides all of the users in the business with the same transparent access to all of their allocated software resources through a same graphical user interface irrespective of which one of the client computers in the network they may sign onto. The operating systems and the application programs to be used on the client computers are loaded on the server. The users have been prompted for the one time input of data required by the server computer to allocate an operating system and application programs for use by each of a plurality of users on each of the plurality of client computers. Responsive to the log on of one of the plurality of users on any one of the client computers, there is distributed to the logged on client computer the operating system and application programs allocated for use by the user through substantially the same graphical user interface irrespective of which client computer the user signs onto. Since the client computers have little or no storage facilities, there are means in the server computer for storing and tracking the above prompted for data entries.

9 Claims, 9 Drawing Sheets

U.S. PATENT DOCUMENTS

| | | | | |
|---|---|---|---|---|
| 5,842,011 | * | 11/1998 | Basu | 713/2 |
| 5,978,911 | * | 11/1999 | Knox et al. | 713/1 |
| 6,026,438 | * | 2/2000 | Piazza et al. | 709/221 |
| 6,052,719 | * | 4/2000 | Bezanson et al. | 709/220 |
| 6,066,182 | * | 5/2000 | Wilde et al. | 717/11 |
| 6,098,097 | * | 8/2000 | Dean et al. | 709/220 |

OTHER PUBLICATIONS

Novell Products and Programs "Zenworks1.1" Oct. 8, 1999, www.novell.com/catalog/bg/bge54205.htm.

* cited by examiner

FIG.5

Company Address and Phone

Type your company's address, phone and fax numbers below. This information may be required for licensing and software registration.

Mailing Address

Physical Address

Phone
Fax

[Help] [< Back] [Next >] [Cancel]

FIG.6

Data Security

To make sure that your data is secure, you will be asked to type a key (password) to access the data that Connected Online Backup has stored for you. The key can be any combination of up to ???? characters, with no spaces. For future reference, make a note of the key and indicate if you have used upper or lower case characters. For added safety, you can store a copy of the key with the Connected Online Backup service by checking the box below.

Data Encryption — 69
Key [xxxx]
Retype Key [xxxx]
Store the Key Offsite also [ ]
— 70

[Help] [< Back] [Next >] [Cancel]

FIG. 9

User Profile — 71

Full Name [ ]   Group [ ]
User Name [ ]   Job [ ]
                              72

Hours / Day of use
of computer [ ] — 73
Hours of Graphics use [ ] — 74

Can you read this?
Check lowest level

My dog is Red   □
My dog is Red   □   76
My dog is Red   □
75  My dog is Red   ☒
My dog is Red   ·

FIG. 10

Licenses

Applications typically come with a license agreement. This agreement ususally spells out the number of users allowed access and other restrictions on use of the application. Agile can restrict access to a certain number of users if desired. The number entered below is the number of users that can access an application at one time.

Number of users
Enter the number of users allowed for this application. This is usually the number of packages purchased.
12

[ Help ] [ < Back ] [ Next > ] [ OK ]

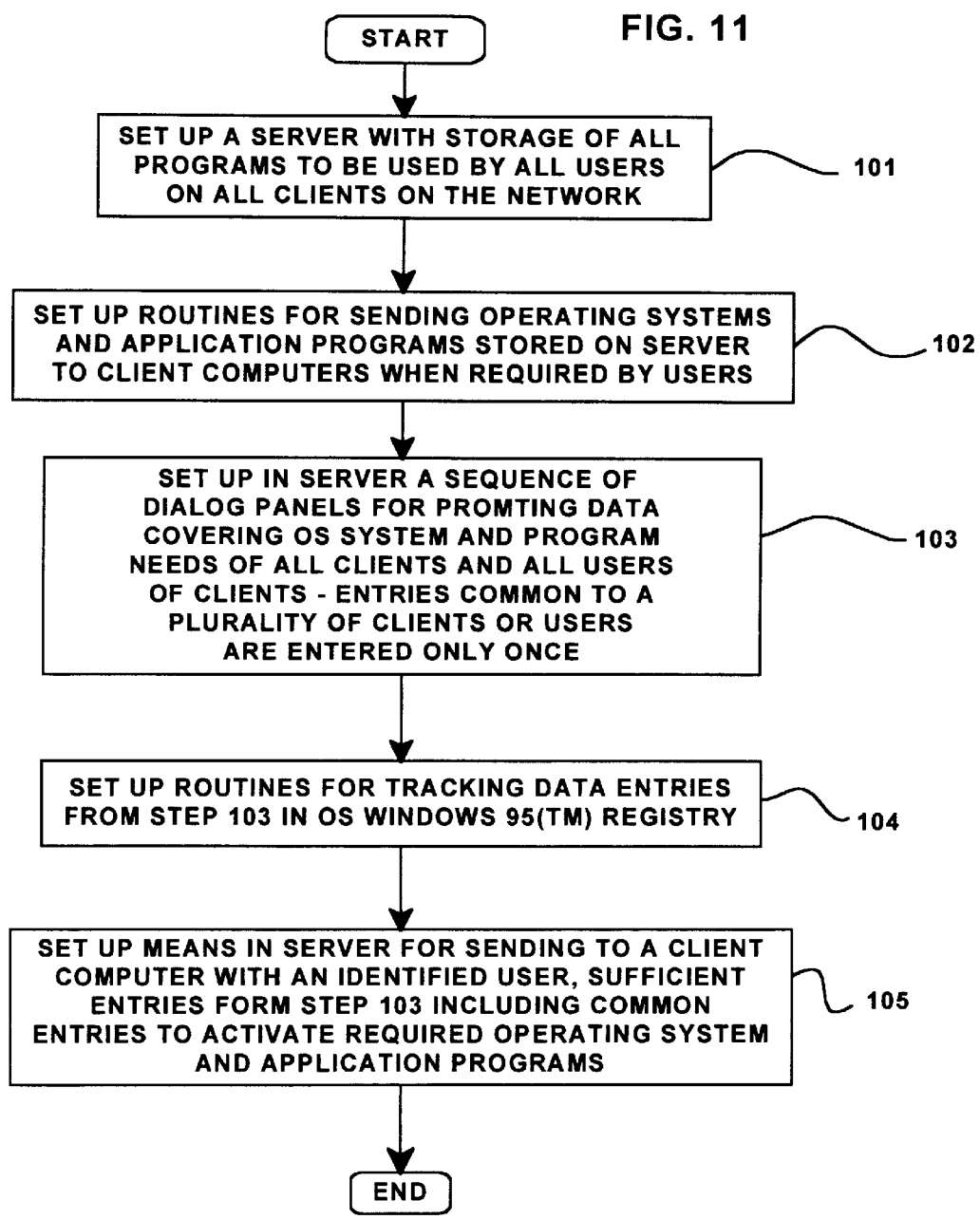

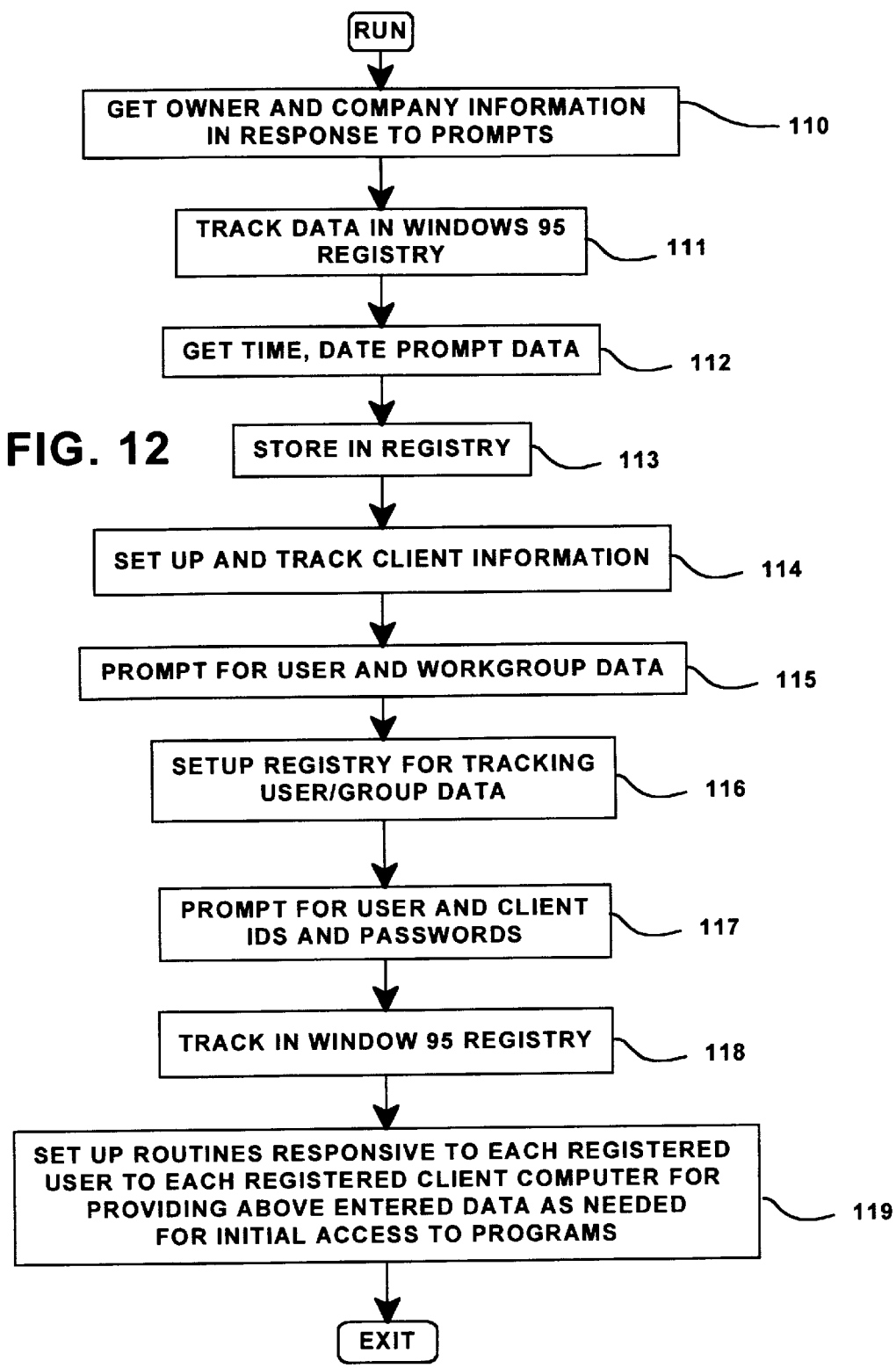

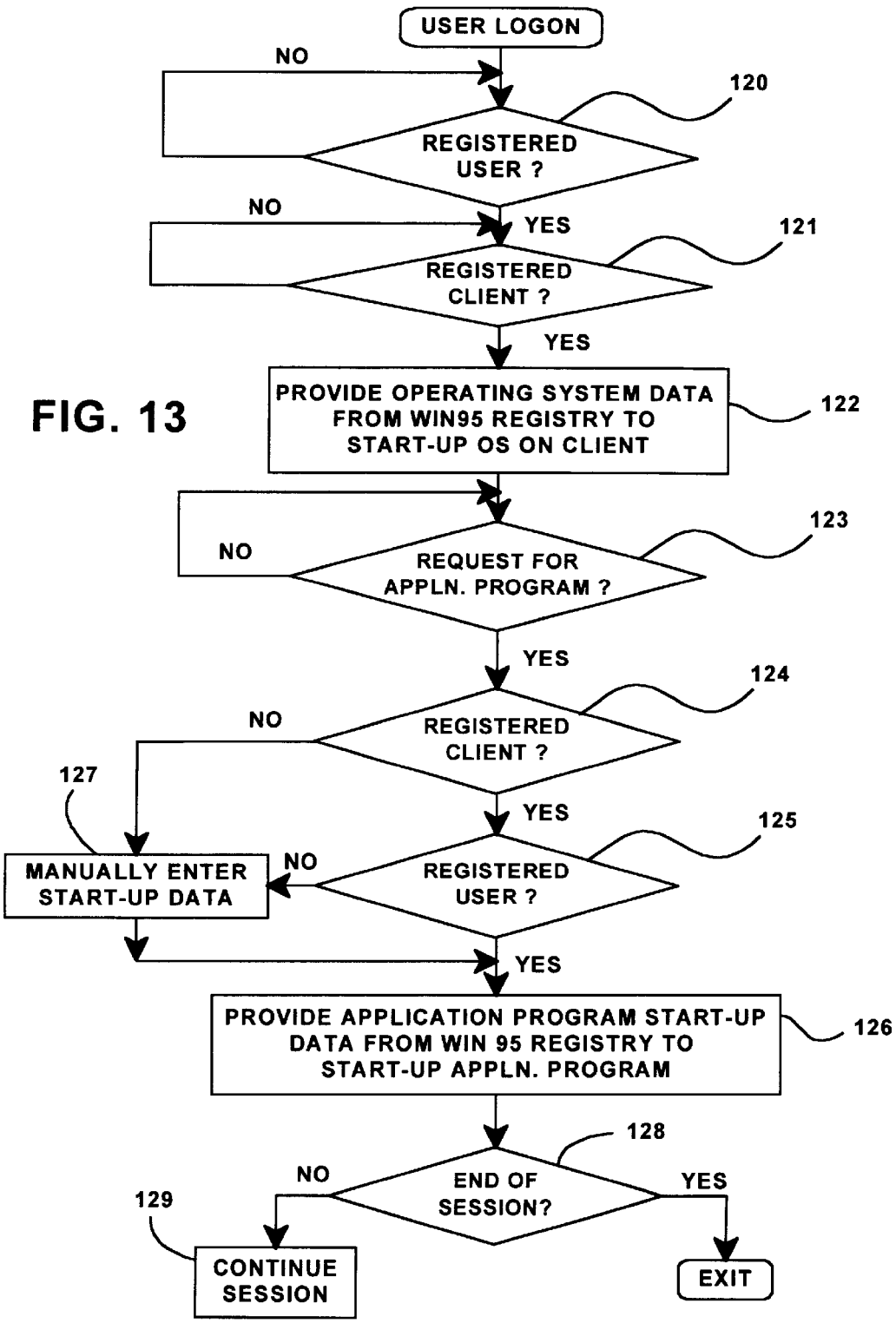

CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS

CROSS-REFERENCE TO RELATED APPLICATIONS

The present patent application is related to Ser. No. 09/118,560, entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS" (Attorney Docket No. AT9-98-231) which is hereby incorporated by reference herein.

The present patent application is related to Ser. No. 09/118,559, entitled "SYSTEM AND METHOD FOR CREATION OF A NETWORK COMPUTING ENVIRONMENT" (Attorney Docket No. AT9-98-230) which is hereby incorporated by reference herein.

In addition, the following applications are also related to the present invention:

The present patent application is related to Ser. No. 09/118,211, entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK" (Attorney Docket No. AT9-98-228)

The present patent application is related to Ser. No. 09/118,208, entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS" (Attorney Docket No. AT9-98-239).

The present patent application is related to Ser. No. 09/118,557, entitled "DATA PROCESSING SYSTEM, METHOD, AND PROGRAM PRODUCT FOR AUTOMATING ACCOUNT CREATION IN A NETWORK" (Attorney Docket No. AT9-98-258).

The present patent application is related to Ser. No. 09/118,293, entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY" (Attorney Docket No. AT9-98-229).

The present patent application is related to Ser. No. 09/118,292, entitled "SERVER AND COMPUTER NETWORK THAT PERMIT A CLIENT TO BE EASILY INTRODUCED INTO THE COMPUTER NETWORK" (Attorney Docket No. AT9-98-257).

The present patent application is related to Ser. No. 09/118,209, entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES" (Attorney Docket No. AT9-98-259).

The present patent application is related to Ser. No. 09/118,207, entitled "METHOD AND APPARATUS FOR CREATING A PRELOAD IMAGE" (Attorney Docket No. AT9-98-261).

The present patent application is related to Ser. No. 09/118,558, entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES" (Attorney Docket No. AT9-98-256).

The present patent application is related to Ser. No. 09/118,555, entitled "AUTOMATIC CLEANUP OF USER DATA IN A NETWORK ENVIRONMENT" (Attorney Docket No. AT9-98-285).

The present patent application is related to Ser. No. 09/118,556, entitled "METHOD AND APPARATUS FOR DETECTING AND INITIALIZING THE ADDITION OF A NEW CLIENT MACHINE IN A NETWORK" (Attorney Docket No. AT9-98-255).

TECHNICAL FIELD

The present invention relates to the configuration of networks, and particularly local area networks of a primary server computer controlling a plurality of client computers applicable to small businesses which are particularly simple to configure and use.

BACKGROUND OF THE INVENTION

Computers and their application programs are used in all aspects of business, industry and academic endeavors. In recent years there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world requires human/computer interaction. The computer industry has been a force for bringing about great increases in business and industrial productivity. Almost every week seems to bring computer industry advances which promise even further increases in productivity. These advances offer to drive down business and industry costs and increase efficiency, in addition to increasing productivity. In addition, the cost of "computer power" continues to drop as a result of rapid advances in computer related technologies.

Despite all of these advantages, there still remains great resistance in all industries and business fields to new computer systems and significant system upgrades which offer much in productivity increases. This resistance results from past experience which equates to installing new computer systems or significant upgrades in existing systems with large amounts of down time, during which the business, manufacturing facility or individual worker functions are inoperative or operate at diminished levels. When a business or production facility is trying to decide whether to install a new computer system, the concern about down time, the possible loss of business, as well as stress on the workers involved, very often outweighs the cost of the installation in influencing the decision. The concern about business and production delays resulting from installation has become so great that fewer and fewer small businesses are trying to make system and program changes on their own. This concern is much greater when the business is considering the installation of a computer network. While many businesses would likely be much more productive if their computers were interconnected with each other, the thought of a network may be very frightening to many small businesses without too much computer experience. They are likely to consider the concepts to be learned and the technology required to connect two or more computers in a network as too complex, time consuming or error prone to be attempted by the average small business user or owner.

There is a substantial challenge in the installation of computer network systems for small businesses. In this marketplace we are dealing with a group whose available time is being stressed to its limits by the pressures of current economic systems. Even though the network computer systems procurable by these business people may offer eventual salvation to their other business stresses, the prospect of a new computer installation is often quite ominous to them. The above-referenced copending applications: "Configuring Computer Network Operations Based Upon the Correlation of a Sequence of Interactive Display User Entries Apparently Unrelated to Computer Operations", Casey, Dean and Rodriguez, Ser. No. 09/118,208 (Attorney Docket No. AT9-98-239) and "Simplified Setting Up of a Network of a Server Computer Preloaded With All Computer Programs Required by a Group of Client Computers to be Connected Into Network", Casey, Dean and Rodriguez, Ser. 09/118,211 (Attorney Docket No. At9-98-228) both provide computer networks which are very easy to install, operate and upgrade. The networks have a primary server computer on which substantially all software including operating systems to be used by client computers in the network is loaded into and maintained in the server computer storage. This software is then allocated to the client computers according to user needs, distributed to the client computers when called for by particular users and then returned to the server computer where the software is stored. The client computers in the networks have minimal storage capacity, as little is stored at the client computers. In fact, the client computers do not need their own hard disk drives.

In addition, small businesses have been particularly susceptible to the trend away from the traditional office environment where the individual was fixed in his office and conducted substantially all of his business efforts from the office. Because of personnel limitations, small business people are often required to be "Jacks-of-all-Trades" and to "office" anywhere on the fly. Thus, we have the trend away from the fixed office with its stand-alone computer loaded with all of the user's software resources. The small business people would like to have access to the computer at the warehouse, at sales counters, at communication centers or at shipping facilities in addition to their traditional offices. The laptop provides some of this flexibility but it needs to carry along its software resources or else the user will have to get remote access to the software through the a wide area network (WAN) like the Internet or a private network with all of the attendant remote access inconveniences, e.g. sign ons, modems etc.

SUMMARY OF THE INVENTION

The present invention provides a solution to the above problems by providing a network of a server and plurality of client computers for small businesses which is easy to install, configure and operate and still provides all of the users in the business with the same transparent access to all of their allocated software resources through the same graphical user interface irrespective of which one the of the client computers in the network they may sign onto.

The present invention comprises means for storing on the server computer the operating systems and the application programs to be used on said client computers together with means for interactively prompting for the one time input of data required by the server computer to allocate an operating system and application programs for use by each of a plurality of users on each of said plurality of client computers, and means responsive to the logon of one of said plurality of users on one of said client computers for distributing to said logged on client computer the operating system and application programs allocated for use by said user through substantially the same graphical user interface irrespective of which client computer the user signs onto.

Since the client computers have little or no storage facilities, there are means in the server computer for storing and tracking the above prompted for data entries. The tracking is preferably done in the registry of the operating system which has been loaded on the server and then allocated to the client computers as needed by logged on users. The operating system is preferably a windows type of operating system such as Windows '95™ and the tracking is done in the registry. The registry, in addition to the entries common to all users and client computers, will also contain data entries made in the customization of graphical user interfaces of respective users as described in the above-referenced copending patent application, "A Network With Storage of All Client Computer Programs in a Server Computer Having Customized Client Graphical User Interfaces With Maximum Sharing of Stored Portions of Interfaces Common to Multiple Clients", Rodriguez, Ser. No. 09/118,560 (Attorney Docket No. AT9-98-231).

BRIEF DESCRIPTION OF THE DRAWINGS

FIG. 5 is the diagrammatic view of the dialog panel for entry of business address information;

FIG. 6 is a dialog panel for the setting up of data security;

FIG. 9 is a dialog panel for establishing user profiles, as well as user vision levels so as to set screen resolution;

FIG. 10 is a prompt dialog panel for qualifying the users of the network as licensed users for a particular application program;

FIG. 11 is a flowchart of the basic elements of the program in the server computer which enables the server to control the data entry described with respect to FIGS. 3 through 10 and subsequently allocate programs;

FIG. 12 is a flowchart of a simplified run illustrating how the one time and other data entries required by the present invention are prompted for and tracked in accordance with the program of FIG. 11; and FIG. 13 is a flowchart of a simplified run to illustrate how the data entries acquired by running the program of FIG. 12 may be used to provide the users with their required programs at whatever client computer they logon to.

DETAILED DESCRIPTION OF THE PREFERRED EMBODIMENT

Figure 1:
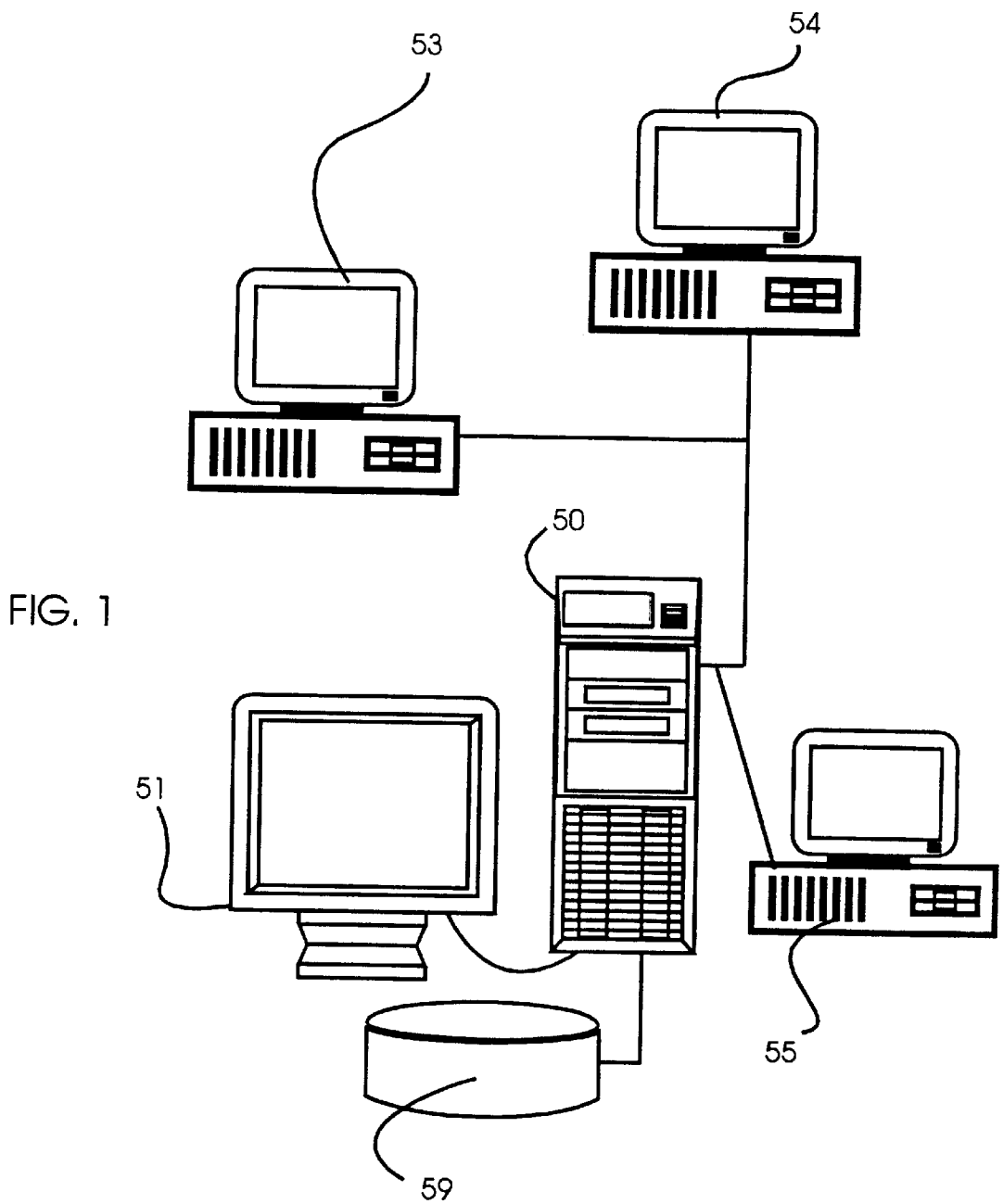
FIG. 1 is a generalized diagrammatic view of a network of server and client computers the interfaces of which may be customized according to the present invention.

With reference to FIG. 1 there is shown a representative diagram of a local network which may be set up in accordance with the present invention. The server computer 50 which has a plurality of client computers: clients 53, 54 and 55. As will be subsequently described, all customization configurations and settings by users are stored in server 50. Initial customizations and configurations which may apply to a network user in general may be made directly to server 50 through its display interface 51. All software including operating systems and application programs for the network and for the client computers in the network are also loaded into server 50 and stored in storage facility 59, which is a diagrammatic representation of the primary server storage capability usually on an associated hard disk drive. As will be seen from the subsequent description, all of the programs to be used in the overall network are stored in association with server 50, e.g. in its storage facility 59, and then distributed as needed to the network users who will sign onto the client computers 53 through 55. The server 50 will allocate the appropriate programming applications to the signed on and identified users at the client computers, irrespective of which client computer the user signs onto.

Figure 2:
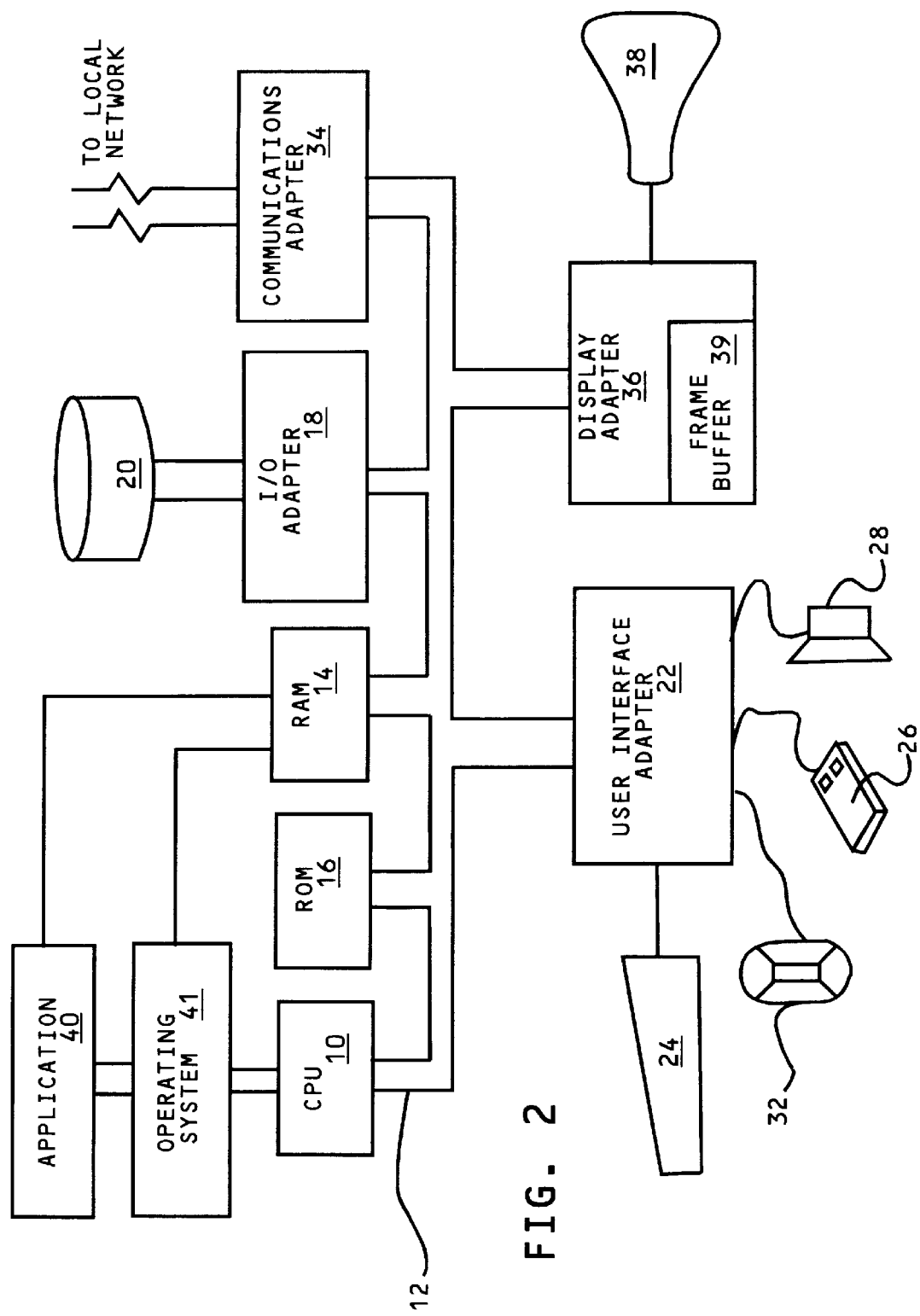
FIG. 2 is a block diagram of an interactive data processor controlled workstation display system including a central processing unit which is capable of serving as the server of this invention.

FIG. 2 is a diagram of a display interface workstation which can function as the primary server 50. A central processing unit (CPU), such as in one of the PC Server series of workstations available from International Business Machines Corporation, or the Poweredge 2200™ Server ("Poweredge 2200" is a trademark of Dell Corporation), is provided and interconnected to various other components by system bus 12. An operating system 41 runs on CPU 10 and provides control and is used to coordinate the function of the various components of FIG. 2. Operating system 41 may be one of the commercially available network operating systems such as Windows NT™ (Windows NT is a trademark of Microsoft Corporation), NetView™ (NetView is a trademark of International Business Machines Corporation) or NetWare™ (NetWare is a trademark of Novell). UNIX or AIX Network operating systems may also be used. The programming application for controlling all of the entries and consequent allocation of operating systems and application programs to the users at all of the client computers may be considered to be illustrated by application 40, which runs in conjunction with operating system 41 and provides output calls to the operating system 41 which implements the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries to be subsequently described; I/O adapter 18 and communications adapter 34 are also interconnected to system bus 12. It should be noted that software components, including the operating system 41 and the application 40, are loaded into RAM 14, which is the computer system's main memory when the operating system and application programs are activated. I/O adapter 18 conventionally communicates with the disk storage device 20, i.e. a hard drive, which will also be involved in the subsequently described storage. Communications adapter 34 interconnects bus 12 with the rest of the local network described in FIG. 1 enabling the data processing system to communicate with its client computers to control entry configurations and the allocation of programs to be subsequently described. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. The client computers 53, 54 and 55 may be considered to have the same general structure described with respect to FIG. 2 except that they would not need a hard disk drive storage device 20.

It should be noted that the operating systems and all application programs to be allocated to the client computers will be stored in the server, mainly in disk storage 20, and when calls are made to distribute such programs to a particular client a copy of the program will be transmitted to the client through I/O adapter to system bus 12 through communications adapter 34 through the local network connection. The operating system copy or application program copy to be used by the user at the client will be received in the RAM of the client and then used in a conventional manner as if the program came from the client's own disk storage. Also, the client computer may be any standard PC such as those available from International Business Machines Corporation or Dell Corporation. The operating systems for the client PCs may be any standard PC operating system such as the OS/2™ (OS/2 is a trademark of International Business Machines Corporation) operating system, Windows '95, as well as UNIX or AIX PC operating systems.

There will now be described a simple illustration of the present invention with respect to the display screens of FIGS. 3 through 8. When the screen images are described it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device, such as mouse 26 of FIG. 2 which operates through user interface 22 to call upon programs in RAM 14 cooperating with the operating system 41 to create the images in frame buffer 39 of display adapter 36 to control the display on monitor 38. As has been set forth hereinabove, all of the programs to be used by all of the users in the network of FIG. 1 are stored in server 50 and its associated storage facility 59. Now with respect to FIGS. 3 through 10, we will describe how information is solicited relative to users and client computers so that the application programs and operating systems stored in the server computer may be allocated among the users of the client computers in the network. A substantial portion of the information solicited through the prompt screens of FIGS. 3 through 10 will be common information required by the operating systems and most of the application programs. This information is solicited only once, stored and tracked by the server computer and then used as needed. The illustration will involve allocations within a small business network. Please note with respect to FIG. 1, the data entry panels shown in FIGS. 3 through 10 will be interactively shown to users on display 51 of server 50. The entries may be made by the employees or users themselves, but it is more likely that they will be made by some sort of supervisory personnel or the system distributor/seller. For the present illustration we will assume that the entries are made to display 51 by a business supervisor who is setting up the network.

Figure 3:
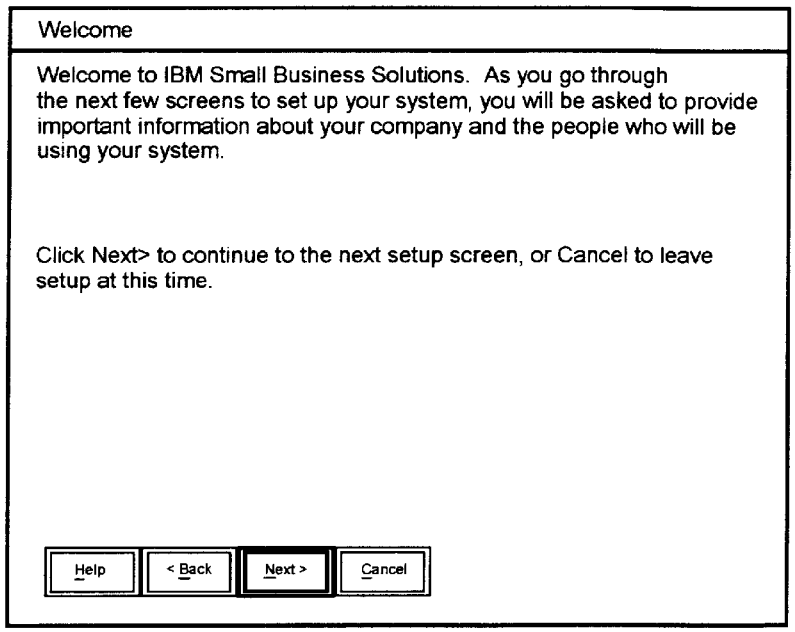
FIG. 3 is a diagrammatic view of an interactive dialog screen on the network server introducing the data entry screens to configure the network installation of the present invention.
Figure 4:
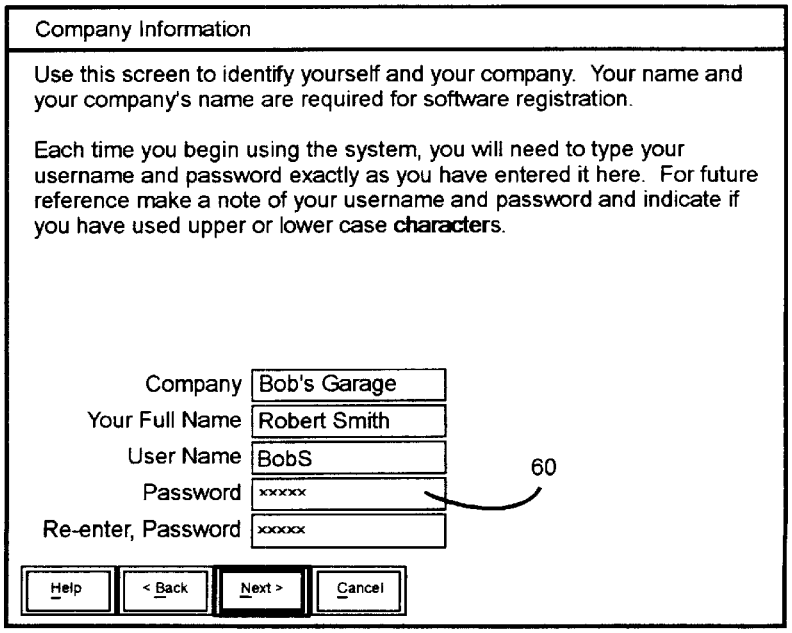
FIG. 4 is the diagrammatic view of an interactive dialog panel for entering company/business information.
Figure 7:
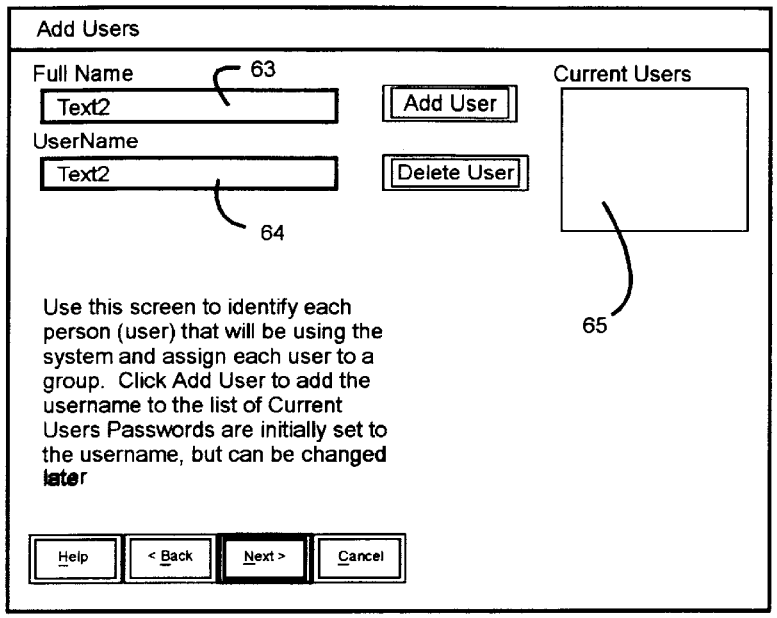
FIG. 7 is a dialog panel for adding users to the network configuration.
Figure 8:
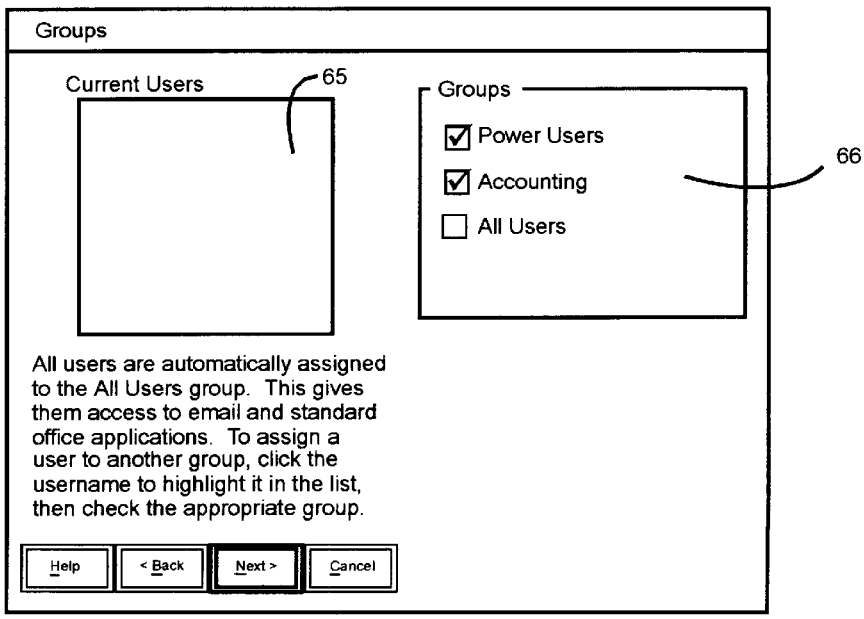
FIG. 8 is a dialog panel for organizing users according to work groups.

The introductory screen panel of FIG. 3 advises the user that information will be solicited and that this information will be used to configure the company's computer network. Screen panel of FIG. 4 solicits company and user information including password 60. Next, the screen panel of FIG. 5 gets information about address, phone and facsimile numbers. The data enterer may also be presented with a data security display panel, FIG. 6, in which data encryption key entries 69 and 70 are prompted for. Then FIG. 7 shows a display panel through which the current users 65 may be organized and new users may be entered through data entry fields 63 and 64. FIG. 8 is a display panel through which the users 65 may be assigned to functional groups 66 so that this information may be used to allocate program resources.

In the data entry panel of FIG. 9, group and job function information entries 71 and 72 are prompted for which will be used to allocate programs for the particular user. Also, the employee's computer hours are solicited 73 and, particularly, graphic hours 74 are important since the system may use this information in an algorithm for setting aside storage space to store and support the user's activities. The panel, or a like panel, may be used to automatically adjust the displays to the user's vision requirements. This illustration shows a simple routine where the viewer is prompted to read the smallest print in group 75 and indicate it by an appropriate selected entry 76. The system will then provide an appropriate screen resolution to compensate for eyesight variations. All of the operating systems and application programs to be allocated to user must be licensed. FIG. 10 shows a typical display panel used to set up licenses for an appropriate number of users. Since the number of users for the operating system and each application program will be the same, this information need only be entered once.

Now, with respect to FIG. 11, there will be generally described the basic elements of the program in the server computer which enables the server to control the operations illustrated with respect to FIGS. 3 through 10 for getting data entries on a one time basis which are then applicable in initiating the allocation and distribution of operating systems and application programs as required by users on the client computers. The server 50, FIG. 1, is set up to store all programs and operating systems to be used by a variety of users on the client computers in the network, step 101. Then, step 102, routines are set up in the server for providing operating systems and application programs to any users as required on any client computer. An appropriate sequence of dialog panels (FIGS. 3 through 10 show examples of such panels) is set up, step 103, for prompting the entry of data on the server computer which will be used to allocate operating systems and programs as required by any user on any client computer. Entries conmmon to a plurality of users, clients or programs are entered only once. Next, step 104, routines are set up for tracking in the server, the data entries described with respect to step 103. This preferably involves the registry in Windows '95 operating system, which is the operating system used by the users on the clients and is stored under the control of the server for subsequent distribution as needed. This registry will track user related data. Then, step 105, as required by any user on any client computer, the server will distribute sufficient entries made in step 103 to the appropriate client computer to activate the operating system and application programs required by that user on that client computer.

Now, with respect to the flowchart of FIG. 12, we will run through a simple illustrative flowchart of some typical steps which the user goes through in the entry of data, particularly the one time entry of common data and the provision of such data to initiate the operating systems and application programs as needed for the users on the client computers. In setting up the network, the server prompts for the entry of software owner and company data, step 110, and this data is tracked in the server, preferably in the registry of the Windows '95 operating system loaded in the server for distribution, step 111. The requisite date and time data is prompted for, step 112, and this data is also stored in the registry. Client computer data is prompted for and stored on the server computer, step 114. User and user work group data is prompted for, step 115, and this is appropriately stored in the registry, step 116. ID's and passwords are prompted for, step 117, and tracked, at least in part, in the registry, step 118. Then routines are set up for each registered user to provide the above-entered data as needed to initiate any operating system or application program on any of the network's client computers, step 119.

Now, with respect to FIG. 13, there will be described the process of starting up any operating system and application program on any client computer for any registered user based upon the information entered and tracked in the server. After the user logs on, a determination is made, decision step 120, as to whether the user is registered. If Yes, then a determination is made, step 121, as to whether the client computer is one registered for the network, i.e. it is one usable by the user to open up the operating system and application programs. If Yes, then the data needed to initiate the operating system for the user on the client is transmitted to the client, step 122. If the decision from either steps 120 or 121 is No, then each step branches back and awaits a registered user logon to a client computer which is part of the network. After the operating system is started up for the appropriate client on the appropriate client computer in step 122, the process awaits a request for an application program by the user, i.e. Yes, step 123. Then, a determination is made, decision step 124, as to whether the user is registered. If Yes, then a determination is made, step 125, as to whether the client computer is one registered for the network, i.e. it is one usable by the user to open up the application programs. If Yes, then the data needed to initiate the application program for the user on the client is transmitted to the client, step 126. If the decision from either steps 120 or 121 is No, then the server will not automatically provide the stored entered data needed to initiate the application program, but the user, in step 127, may manually enter the data necessary to initiate or start up the application program. After the user has worked with the desired application program, a determination may be made, step 128, as to whether we are at the end of the session. If Yes, the program will be exited; otherwise, the session will continue, step 129.

Reference has been made herein to the Windows '95 operating system registry. Further details relative to this registry may be found in many textbooks on Windows '95. For example in the text, *Windows '95, 2nd Edition*, Al Stevens, 1997, MIS:Press, New York, N.Y., particularly Chapter 19, pp. 431–441.

One described and claimed implementation of the present invention is as an application program made up of programming steps or instructions. Such a program 40 would be resident in RAM 14 of the server, FIG. 2, during computer operations. Until required by the computer system, the program instructions may be stored in another readable medium, e.g in disk drive 20, or in a removable memory such as an optical disk for use in a CD-ROM computer input, or on a floppy disk for use in a floppy disk drive computer input. Further, the program instructions may be stored in the memory of another computer prior to use in system of the present invention and transmitted over a local area network (LAN) or a WAN, such as the Internet, when required by the user of the present invention. One skilled in the art should appreciate that the processes controlling the present invention are capable of being distributed in a variety of computer readable forms.

Although certain preferred embodiments have been shown and described, it will be understood that many changes and modifications may be made therein without departing from the scope and intent of the appended claims.

What is claimed is:

1. A computer network comprising at least one server computer and a plurality of client computers enabling a user to access substantially the same interface on any one of said client computers comprising:

means for storing on said server computer the operating systems and the application programs to be used on said client computers, means in said server computer for interactively prompting through a display interface for the one time input of a sequence of data entries required by the server computer to allocate an operating system and application programs for use by each of a plurality of users on each of said plurality of client computers based upon the respective computing needs of each of said users, means in said server computer for tracking said data entries, and means responsive to the logon of one of said plurality of users on any one of said client computers for distributing to said logged on client computer the operating system and application programs allocated for use a by said user.

2. The computer network of claim 1 wherein said means for tracking said data entries are in the registry of an allocated operating system stored on said server.

3. The computer network of claim 2 wherein said allocated operating system is a windows operating system.

4. In a computer network of at least one server computer and a plurality of client computers, a method enabling a user to access substantially the same interface on any one of said client computers comprising:

storing on said server computer the operating systems and the application programs to be used on said client computers, interactively prompting through a display interface to said server computer for the one time input of a sequence of data entries required by the server computer to allocate an operating system and application programs for use by each of a plurality of users on each of said plurality of client computers based upon the respective computing needs of each of said users, tracking said data entries on said server computer, and responsive to the logon of one of said plurality of users on any one of said client computers, distributing to said logged on client computer the operating system and application programs allocated for use by said user.

5. The method of claim 4 wherein said data entries are stored in the registry of an allocated operating system stored on said server.

6. The method of claim 5 wherein said allocated operating system is a windows operating system.

7. A computer program having program code included on a computer readable medium for enabling a user to access substantially the same interface on any client computer in a computer network comprising at least one server computer and a plurality of client computers comprising:

means for storing on said server computer the operating systems and the application programs to be used on said client computers, means in said server computer for interactively prompting through a display interface for the one time input of a sequence of data entries required by the server computer to allocate an operating system and application programs for use by each of a plurality of users on each of said plurality of client computers based upon the respective computing needs of each of said users, means in said server computer for tracking said data entries, and means responsive to the logon of one of said plurality of users on any one of said client computers for distributing to said logged on client computer the operating system and application programs allocated for use by said user.

8. The computer program of claim 7 wherein said means for tracking said data entries are in the registry of an allocated operating system stored on said server.

9. The computer program of claim 8 wherein said allocated operating system is a windows operating system.

* * * * *